United States Patent [19]

Hölzle et al.

[11] 4,394,125
[45] Jul. 19, 1983

[54] PROCESS FOR BLEACHING TEXTILES AND FOR COMBATING MICRO-ORGANISMS WITH SULFONATED PHTHALOCYANINE OF ALUMINUM OR ZINC AND CONTAINING HALOGEN OR CYANO SUBSTITUENTS AS PHOTOACTIVATOR

[75] Inventors: Gerd Hölzle, Liestal; Gerhard Reinert, Allschwil; Rudolf Polony, Basel, all of Switzerland

[73] Assignee: Ciba-Geigy Corporation, Ardsley, N.Y.

[21] Appl. No.: 298,229

[22] Filed: Aug. 31, 1981

[30] Foreign Application Priority Data

Sep. 9, 1980 [CH] Switzerland ................ 6764/80
Sep. 9, 1980 [CH] Switzerland ................ 6765/80

[51] Int. Cl.$^3$ .............. D06L 3/00; A01N 43/00; C02F 1/50
[52] U.S. Cl. ............................... 8/103; 8/101; 8/107; 8/137; 252/8.6; 252/8.7; 260/245.78; 260/245.82; 260/245.86; 422/22; 422/28
[58] Field of Search ............... 8/101, 103, 137, 107; 252/8.6, 8.7; 260/245.78, 245.82; 422/22, 28

[56] References Cited

U.S. PATENT DOCUMENTS

| | | | |
|---|---|---|---|
| 2,647,126 | 7/1953 | Pugin | 260/245.78 |
| 3,300,512 | 1/1967 | Gerson et al. | 260/245.82 |
| 3,770,765 | 11/1973 | Jaffe | 260/245.82 |
| 3,927,967 | 12/1975 | Speakman | 8/103 |
| 4,033,718 | 7/1977 | Holcombe et al. | 8/103 |
| 4,077,768 | 3/1978 | Johnston et al. | 8/107 |
| 4,094,806 | 6/1978 | Wiers | 8/103 |
| 4,166,718 | 9/1979 | Reinert et al. | 8/111 |
| 4,217,105 | 8/1980 | Goodman | 8/111 |
| 4,240,920 | 12/1980 | de Luque | 8/101 |
| 4,255,273 | 3/1981 | Sakkab | 8/103 |
| 4,256,597 | 3/1981 | Sakkab | 8/101 |
| 4,311,605 | 1/1982 | Eckhardt et al. | 8/103 |
| 4,318,883 | 3/1982 | Polony et al. | 422/22 |

FOREIGN PATENT DOCUMENTS

| | | |
|---|---|---|
| 3149 | 1/1979 | European Pat. Off. |
| 3371 | 1/1979 | European Pat. Off. |
| 3861 | 2/1979 | European Pat. Off. |
| 1372035 | 10/1974 | United Kingdom |
| 1408144 | 10/1975 | United Kingdom |

OTHER PUBLICATIONS

Venkataraman's "The Chemistry of Synthetic Dyes", vol. V (1971, Academic Press) pp. 255–261.
Research Disclosure, Jun. 1979, No. 182, Item 18241, p. 347.
Abstract of Disclosure.
Research Disclosure (1960) 18241 p. 347.

*Primary Examiner*—A. Lionel Clingman
*Attorney, Agent, or Firm*—Edward McC. Roberts

[57] ABSTRACT

A process is proposed for bleaching textiles or removing stains from textiles and for combating micro-organisms in or on organic or inorganic substrates, or for protecting the latter against attack by micro-organisms, by treating the textiles or the substrates to be freed of or protected from micro-organisms with a water-soluble zinc phthalocyanine or aluminium phthalocyanine, in the presence of water and under irradiation with light, in which process a sulfonated zinc phthalocyanine or aluminium phthalocyanine which is further substituted by neutral groups which do not confer solubility in water, for example by halogen atoms or pseudo-halogens, or a mixture of these phthalocyanine compounds, is used as the water-soluble zinc phthalocyanine or aluminium phthalocyanine.

Bleaching, washing and soaking agents or agents having an antimicrobial action, for carrying out the process, are also proposed, which, in addition to the active ingredient, contain, if appropriate, inorganic salts, water and also, in the case of washing agents, customary washing agent constituents. Novel sulfonated zinc phthalocyanine and aluminium phthalocyanine compounds and their preparation are furthermore described.

13 Claims, No Drawings

PROCESS FOR BLEACHING TEXTILES AND FOR COMBATING MICRO-ORGANISMS WITH SULFONATED PHTHALOCYANINE OF ALUMINUM OR ZINC AND CONTAINING HALOGEN OR CYANO SUBSTITUENTS AS PHOTOACTIVATOR

The present invention relates to a process for bleaching textiles or removing stains from textiles and for combating micro-organisms in or on organic or inorganic substrates, or for protecting the latter against attack by micro-organisms, and also to bleaching agents, washing agents, soaking agents and agents having an antimicrobial action, for carrying out the process, and to novel sulfonated zinc phthalocyanine compounds and aluminium phthalocyanine compounds and their preparation.

Processes for bleaching textiles with photosensitising compounds, for example with water-soluble, in particular sulfonated, phthalocyanine derivatives, and corresponding washing agents, are already known, cf. U.S. Pat. Nos. 3,927,967, 4,033,718 and 4,094,806, German Offenlegungsschriften Nos. 2,222,829 and 2,627,449 and European Patent Application Nos. 3,149, 3,371 and 3,861. A process for bleaching textiles with the aid of water-soluble aluminium phthalocyanine compounds, for example with the aid of sulfonated aluminium phthalocyanine compounds, and corresponding washing agents, are known from U.S. Pat. No. 4,166,718.

Moreover, a process for combating micro-organisms on various substrates with the aid of water-soluble phthalocyanine compounds, for example aluminium and zinc phthalocyanine compounds, especially with the aid of sulfonated aluminium and zinc phthalocyanine, and a composition containing these active ingredients, are known from German Offenlegungsschrift No. 2,812,261.

The first object of the present invention was thus to find a process for bleaching textiles and corresponding bleaching agents and washing agents for carrying out this process, which are even more active, more economical and more advantageous than those described above. It was found, surprisingly, that the use of sulfonated zinc phthalocyanines and aluminium phthalocyanines which are further substituted by neutral groups which do not confer solubility in water, as photoactivators, improves the efficiency of the known processes so that the stated object could thereby be achieved.

The second object of the present invention was to find a process for combating micro-organisms on various substrates, and corresponding agents for carrying out this process, which are even more active, more economical and more advantageous than those known from German Offenlegungsschrift No. 2,812,261. It was found, surprisingly, that the use of sulfonated zinc phthalocyanines and aluminium phthalocyanines which are further substituted by neutral groups which do not confer solubility in water improves the efficiency of the known process so that the stated object could thereby be achieved.

The process according to the invention for bleaching textiles or removing stains from textiles and for combating micro-organisms in or on organic or inorganic substrates, or for protecting the latter against attack by micro-organisms, by treating the textiles, or the substrates to be freed of or protected from micro-organisms, with water-soluble zinc phthalocyanines or aluminium phthalocyanines, in the presence of water and under irradiation with light, comprises using, as water-soluble zinc phthalocyanines or aluminium phthalocyanines, sulfonated zinc phthalocyanines or aluminium phthalocyanines which are further substituted by neutral groups which do not confer solubility in water, for example by halogen atoms or pseudo-halogens, or mixtures of these phthalocyanine compounds.

As a first feature, the present invention thus relates to a process for bleaching textiles or removing stains from textiles, which comprises treating the latter, in the presence of water and under irradiation with light, with sulfonated zinc phthalocyanines or aluminium phthalocyanines which are further substituted by neutral groups which do not confer solubility in water, for example by halogen atoms or pseudo-halogens, or with mixtures of these phthalocyanine compounds.

The second feature relates to a process for combating micro-organisms in or on organic or inorganic substrates, or for protecting the latter against attack by micro-organisms, which comprises treating the said substrates, in the presence of water and under irradiation with light, with sulfonated zinc phthalocyanines or aluminium phthalocyanines which are further substituted by neutral groups which do not confer solubility in water, for example by halogen atoms or pseudo-halogens, or with mixtures of these phthalocyanine compounds.

In the process according to the invention, suitable sulfonated zinc phthalocyanines or aluminium phthalocyanines are, in particular, those of the formula

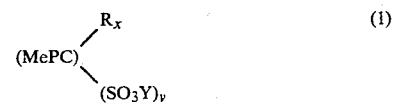

in which MePC is the zinc phthalocyanine or aluminium phthalocyanine ring system, Y is hydrogen, an alkali metal ion, an ammonium ion or an amine salt ion, v is any number between 1 and 4, R is fluorine, chlorine, bromine, iodine or cyano and x is any number between 0.1 and 8, it being possibe for the substituents R present in the molecule to be identical or different.

The particularly preferred compounds of the formula (1) are those of the formula

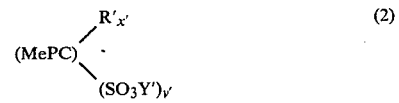

in which MePC is the zinc phthalocyanine or aluminium phthalocyanine ring system, Y' is hydrogen, an alkali metal ion or an ammonium ion, v' is any number between 1.3 and 4, R' is chlorine or bromine and x' is any number between 0.5 and 8.

In the formula (2) v' is preferably any number between 2 and 4, in particular between 3 and 4, and x' is preferably any number between 0.8 and 4. As is customary in phthalocyanine chemistry, the individual products frequently consist of mixtures because no pure products are formed in the preparation (for example by sulfonation, halogenation or the like).

In the context of the formula (2), possible compounds which can be used in the process according to the invention are, in particular, those in which Y' is hydrogen, sodium or potassium, v' is any number between 2 and 4, in particular between 3 and 4, R' is chlorine or bromine, preferably chlorine, and x' is any number between 0.8 and 2, for example those in which Y' is hydrogen, sodium or potassium, v' is any number between 3 and 4, R' is bromine and x' is any number between 0.5 and 1.5.

The said aluminium phthalocyanine compounds, in particular those of the formula

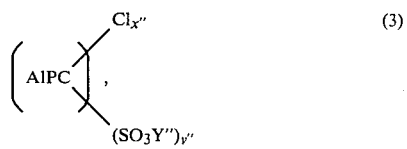

in which AlPC is the aluminium phthalocyanine ring system, $x''$ is any number between 0.8 and 1.5, $v''$ is any number between 3 and 4 and $Y''$ is hydrogen or sodium, are particularly preferably used in the process according to the invention.

The compounds of the formulae (1) and (2) and the preferred compounds derived therefrom are novel and also form a subject of the present invention.

As is known from phthalocyanine chemistry, the third valency of the aluminium in the aluminium phthalocyanine ring system is saturated by an additional ligand, for example an anion. This anion can be identical to the anion of the aluminium compound which was used for the preparation of the complex. It is not significant in terms of the activity of the particular compound. Examples of these anions are halide, sulfate, nitrate, acetate or hydroxyl ions.

The expression "an amine salt ion" Y is to be understood as meaning a substituted ammonium ion, for example one of the formula

in which $R_1$, $R_2$ and $R_3$ independently of one another are hydrogen or alkyl (preferably having 1-4 C atoms) which is unsubstituted or substituted by halogen, hydroxyl, phenyl or cyano, at least one substituent R being different from hydrogen. Two radicals R together can also complete a saturated 5-membered or 6-membered nitrogen heterocyclic ring which, if appropriate, additionally contains an oxygen atom or nitrogen atom as a ring member. Examples of these heterocyclic rings are: piperidine, piperazine, morpholine, pyrrolidine, imidazoline and the like.

The index v indicates the degree of sulfonation, which of course does not have to be an integer. Preferred degrees of sulfonation are between 1.3 and 4, in particular between 2 and 4. The number of sulfo groups required in the molecule also depends on the number of substituents R present. In every case, there must be a sufficient number of sulfo groups present to ensure adequate solubility in water. A minimum solubility of only 0.01 g/liter can be sufficient; in general, a solubility of 0.1 to 20 g/liter is advantageous.

The bleaching and stain-removal process according to the invention, i.e. the treatment of the textiles with the sulfonated zinc phthalocyanine or aluminium phthalocyanine, is preferably carried out in the neutral or alkaline pH range.

The sulfonated zinc phthalocyanines or aluminium phthalocyanines are advantageously used in amounts of 0.01 to 100, in particular 0.01 to 50, mg/liter of treatment bath, it being possible for the amount used to vary with the degree of sulfonation and the substituents R.

The process is preferably carried out as a combined washing and bleaching process, in which case the aqueous bath also contains an organic washing agent, such as soap or synthetic washing agents (see below), and, if appropriate, can also contain other washing agent additives such as soil suspending agents, for example sodium carboxymethylcellulose and fluorescent brightening agents. The sulfonated zinc phthalocyanine or aluminium phthalocyanine can therefore either be incorporated directly into the corresponding washing agent or be added to the wash liquor later. However, the process can also be carried out as a pure bleaching process without washing agent additives. In this case, the treatment bath advantageously contains an electrolyte, for example sodium chloride, sodium sulfate or sodium tripolyphosphate, in order to ensure the absorption of the aluminium phthalocyanine dye. The amounts of electrolyte can be about 0.5 to 20 g/liter.

The bleaching process according to the invention is advantageously carried out at temperatures in the range from about 20 to 100, in particular from 20° to 85° C., for a period of 15 minutes to 5 hours, preferably 15 minutes to 60 minutes.

The presence of oxygen and the irradiation with light are necessary for the bleaching process according to the invention. The oxygen dissolved in the water or present in the air suffices as the source of oxygen.

The irradiation can be carried out with an artificial light source which, for example, produces light in the visible and/or infra-red region (for example an incandescent lamp or infra-red lamp), it being possible for the bleaching bath or washing bath to be irradiated directly, either by means of a light source inside the vessel containing the liquor (for example a lamp in the washing machine) or by means of a light source outside the vessel. Likewise, however, it is also possible not to carry out the irradiation until after the textiles have been removed from the treatment bath. In this case, however, the textiles should still be damp or they must be dampened again afterwards. Particularly advantageously, however, sunlight can also be used as the light source, the textiles being exposed to the sunlight either during a treatment in the soaking bath, or after the treatment in the washing bath or bleaching bath, in the damp state.

To develop their antimicrobial activity, the zinc phthalocyanine and aluminium phthalocyanine compounds which can be used in the process according to the invention require the presence of oxygen and water and also irradiation with light. In general, the process is therefore carried out in aqueous solutions or on dump substrates and the oxygen dissolved in the water or the atmospheric oxygen is used as the source of oxygen. The presence of reducing agents destroys or reduces the action of the active substances.

The irradiation can be carried out with an artificial light source which, for example, produces light in the infra-red and/or visible region, or also by means of sunlight. A good action is achieved, for example, by means of light in the region between about 300 and 2,500 nm. Thus, irradiation can be carried out, for example, with a commercially available incandescent lamp. The intensity of illumination can vary within wide limits. It depends on the cooncentration of active ingredient, on the nature of the substrate or on the substances additionally present, by which the luminous intensity is influenced. As a further parameter, the irradiation time can be varied, i.e. for the same action, irradiation must be carried out for a longer time in the case of lower luminous intensity than in the case of higher intensity. In general, irradiation times of a few minutes up to a few hours are possible, depending on the field of application.

If the process is carried out in an aqueous bath (for example in the sterilisation of textiles), either the irradiation with light can be carried out directly in the treatment bath by means of an artificial light source located inside or outside the latter, or, afterwards, the substrates in the damp state can either be illuminated with an artificial light source in the same way, or can be exposed to sunlight.

Good antimicrobial effects can be achieved with only very small concentrations of active substance, for example with 0.001 ppm. The concentration is preferably between 0.05 and 100 and more preferably between 0.01 and 50 ppm, depending on the field of application and on the phthalocyanine derivative used. Since the active substances are dyes, the upper concentration limit is given by the fact that an undesired colouration of the substrates would be observed if it were exceeded. The upper concentration limit is therefore limited by the strength of the intrinsic colour of the agent used, but can be 1,000 ppm or more.

The zinc phthalocyanine and aluminium phthalocyanine compounds used in the process according to the invention have an exceptionally broad spectrum of activity against micro-organisms. Thus, the process according to the invention makes it possible to combat, in particular, Gram-positive and Gram-negative bacteria or to protect various substrates against attack by the latter. An excellent action is also observed against fungi.

In the process according to the invention, it is also possible to add action-enhancing substances such as, inter alia, electrolytes, for example inorganic salts such as sodium chloride, potassium chloride, sodium sulfate, potassium sulfate, sodium acetate, ammonium acetate, alkali metal phosphates and alkali metal tripolyphosphates, in particular sodium chloride and sodium sulfate. These salts can be added to the compositions according to the invention or directly in the application process, so that they are preferably present in a concentration of 0.1 to 10% in the application solution.

Because of the said broad spectrum of action against micro-organisms, the process according to the invention or the compositions according to the invention can be used in a number of fields of application, which are mentioned below by way of examples.

An important application is the disinfection of textiles of synthetic or natural origin. Thus, domestic or industrial laundry can be disinfected with the aid of the process according to the invention. For this purpose, the laundry can be treated with aqueous solutions of water-soluble phthalocyanine derivatives, under irradiation with light, in the abovementioned manner. The phthalocyanine dye can advantageously be present in the treatment liquor in a concentration of 0.01 to 50 mg/liter. Disinfection can advantageously also be carried out together with the washing process. For this purpose, the laundry is treated with a wash liquor which contains customary detergent substances, one or more water-soluble zinc phthalocyanine or aluminium phthalocyanine derivatives and, if appropriate, inorganic salts and/or other substances having an antimicrobial action. The washing process can be carried out by hand, for example in a tub, or also in a washing machine. The required irradiation can be carried out during the washing process by means of suitable light sources, or also the damp laundry can afterwards, for example during drying, either be irradiated with a suitable artificial light source or also simply be exposed to sunlight.

The antimicrobial active ingredients can be added directly to the disinfecting liquor or wash liquor. However, they can also be incorporated into soaps or washing powders which contain known mixtures of detergent substances, for example soap in the form of flakes and powder, synthetics, soluble salts of sulfonic acid half-esters of higher fatty alcohols, higher alkyl-substituted and/or alkyl-polysubstituted arylsulfonic acids, sulfocarboxylic acid esters of intermediate to higher alcohols, fatty acid acylaminoalkyl- or acylaminoaryl-glycerolsulfonates, phosphoric acid esters of fatty alcohols and the like, so-called builders, for example alkali metal polyphosphates and polymetaphosphates, alkali metal pyrophosphates, alkali metal salts of carboxymethylcellulose and other soil redeposition inhibitors, and also alkali metal silicates, nitrilotriacetic acid, ethylenediaminetetraacetic acid, foam stabilisers such as alkanolamides of higher fatty acids, and, if appropriate, antistatic agents, fat-restorative skin protectives such as lanolin, enzymes, perfumes and dyes, fluorescent brighteners, further inorganic salts and/or further antimicrobial active ingredients.

Care must be taken to ensure that the wash liquors or washing agents do not contain any reducing agents, because otherwise the oxygen necessary for the antimicrobial activity of the phthalocyanines is not available.

The process according to the invention can also be used for the antimicrobial finishing of textiles because the zinc phthalocyanine and aluminium phthalocyanine derivatives absorb well onto the fibre and thus ensure a long-lasting effect.

A further field of application of the process according to the invention and of the compositions according to the invention is the disinfection of hospital laundry, medical utensils and equipment and floors, walls and furniture (surface disinfection) in general and also in hospitals in particular. The disinfection of hospital laundry can be carried out in the manner described above for general laundry. The other objects and floor and wall surfaces can be treated with aqueous solutions which contain sulfonated zinc phthalocyanine or aluminium phthalocyanine compounds, and can be irradiated at the same time, or afterwards, with suitable light sources. The disinfecting solutions can additionally contain detergent substances, other compounds having an antimicrobial action and/or inorganic salts.

For surface disinfection, it is possible, for example, to apply, to the particular surface, an aqueous solution of the phthalocyanine compounds according to the invention (for example by spraying), which solution preferably contains about 0.001–50 ppm of active substance. The solution can also contain other customary additives, for example wetting, dispersing or emulsifying agents, detergent substances and, if appropriate, inorganic salts. The surface is simply exposed to sunlight after the solution has been applied, or, if required, irradiation can additionally be carried out with an artificial light source, for example an incandescent lamp. It is recommended to keep the surface damp during irradiation.

The process according to the invention or the compositions according to the invention can also advantageously be used for sterilising or disinfecting swimming baths and swimming pools. For this purpose, one or more of the phthalocyanine compounds which can be used in the process according to the invention are advantageously added to the water in the swimming bath or pool, preferably in an amount of between 0.001 and 50 ppm, in particular between 0.01 and 10 ppm. Irradiation is effected simply by means of sunlight. If appropriate, additional irradiation can be provided by means of built-in lamps. The process described makes it possible to keep the water in swimming pools free of troublesome germs and to maintain excellent water quality.

The process according to the invention can also be applied to the disinfection of effluents from sewage purification plants. For this purpose, for example 0.001–100 ppm, in particular 0.01–10 ppm, of one or more of the phthalocyanine compounds which can be used in the process according to the invention are added to the effluent. Irradiation is advantageously effected by means of sunlight and, if appropriate, can additionally be carried out with artificial light sources.

The possible applications mentioned above only represent a list of examples of the very broad applicability of the process according to the invention.

The present invention also relates to compositions for carrying out the process according to the invention, in particular agents having an antimicrobial action and bleaching agents, washing agents and soaking agents. These compositions contain one or more sulfonated zinc phthalocyanines and/or aluminium phthalocyanines which are further substituted by neutral groups which do not confer solubility in water. Preferably, these compositions contain phthalocyanine compounds of the formulae (1) and (2) and the particularly preferred compounds covered thereby, for example those of the formula (3). According to the type of application, the said compositions can additionally contain customary formulation constituents.

Preferred compositions of this type contain one or more zinc phthalocyanine and/or aluminium phthalocyanine compounds defined above, one or more inorganic salts, for example NaCl, KCl, NaBr, KBr, $K_2SO_4$, $Na_2SO_4$, $K_2CO_3$, $Na_2CO_3$, $NaHCO_3$ and the like, in particular NaCl and/or $Na_2SO_4$, and, if appropriate, water. For example, a composition of this type consists of about 50–80% of a compound of the formula (1), in particular of the formula (2) or (3), 10–30% of NaCl and/or $Na_2SO_4$, for example 5–15% of NaCl and 5–15% of $Na_2SO_4$, and 0 to 30% of water. These compositions can also be present in aqueous solution, for example in the form of a 5–50% solution, for example a 5–20% solution.

In addition to the zinc phthalocyanine or aluminium phthalocyanine active ingredient, washing agents with a bleaching action, according to the invention, contain, for example, customary washing-agent constituents, for example one or more organic detergents, alkaline builder salts and, if appropriate, further bleaching agents, for example percompounds such as a perborate, percarbonate or the like.

The washing agents or soaking agents according to the invention contain, for example, the known mixtures of detergent substances, for example soap in the form of flakes and powders, synthetics, soluble salts of sulfonic acid half-esters of higher fatty alcohols, higher alkyl-substituted and/or alkyl-polysubstituted arylsulfonic acids, sulfocarboxylic acid esters of intermediate to higher alcohols, fatty acid acylaminoalkyl- or acylaminoarylglycerolsulfonates, phosphoric acid esters of fatty alcohols and the like. Examples of suitable so-called builders are alkali metal salts of carboxymethylcellulose and other soil redeposition inhibitors, and also alkali metal silicates, alkali metal carbonates, alkali metal borates, alkali metal perborates, alkali metal percarbonates, nitrilotriacetic acid, ethylenediaminetetraacetic acid, and foam stabilisers such as alkanolamides of higher fatty acids. The washing agents can further contain, for example: antistatic agents, fat-restorative skin protectives such as lanolin, enzymes, antimicrobial agents, perfumes and fluorescent brighteners.

The washing agents or soaking agents according to the invention preferably contain the sulfonated zinc phthalocyanine and/or aluminium phthalocyanine compounds in an amount of 0.0005 to 1.5 percent by weight, in particular 0.005–1 percent by weight, based on the total washing or soaking agent.

For example, washing or soaking agents with a bleaching action, according to the invention, contain 0.005–1% by weight of the abovementioned sulfonated zinc phthalocyanine and/or aluminium phthalocyanine compounds, 10–50% by weight of an anionic, nonionic, semi-polar, ampholytic and/or zwitterionic surface-active substance, 0–80% of an alkaline builder salt and, if appropriate, further customary washing-agent constituents, for example those which are mentioned above.

Examples of suitable surface-active substances in the said compositions are also water-soluble alkylbenzenesulfonates, alkylsulfates, alkyl polyethoxy-ethersulfates, paraffinsulfonates, $\alpha$-olefinsulfonates, $\alpha$-sulfocarboxylic acids, their salts and esters, alkylglycerylether-sulfonates, fatty acid monoglyceride-sulfates or -sulfonates, alkylphenol-polyethoxy-ether-sulfates, 2-acyloxyalkanesulfonates, $\beta$-alkoxyalkanesulfonates, soaps, polyethoxy-fatty alcohols, alkylphenols, polypropoxyglycols, polypropoxy-ethylenediamines, amine oxides, phosphine oxides, sulfoxides, aliphatic secondary and tertiary amines, aliphatic quaternary ammonium, phosphonium and sulfonium compounds or mixtures of the said substances.

Examples of alkaline builder salts which can be present in the compositions according to the invention in an amount of, for example, 10–60% by weight, are, inter alia: water-soluble alkali metal carbonates, borates, phosphates, polyphosphates, bicarbonates and silicates, water-soluble aminopolycarboxylates, phytates, polyphosphonates and polycarboxylates, and water-insoluble aluminium silicates.

As already mentioned, the antimicrobial compositions according to the invention contain one or more sulfonated zinc phthalocyanines and/or aluminium phthalocyanines which are further substituted by neutral groups which do not confer solubility in water, in particular those of the formula (1) and (2) and the particularly preferred compounds covered thereby, for example those of the formula (3), and, if appropriate, customary formulation constituents.

Preferred compositions of this type contain one or more aluminium phthalocyanine compounds defined above, one or more inorganic salts, for example NaCl, KCl, NaBr, KBr, $K_2SO_4$, $Na_2SO_4$, $K_2CO_3$, $Na_2CO_3$, NaHCO$_3$ and the like, in particular NaCl and/or Na$_2$SO$_4$, and, if appropriate, water. For example, a composition of this type consists of about 50–80% of a compound of the formula (1), in particular of the formula (2) or (3), 1–30% of NaCl and/or Na$_2$SO$_4$, for example 5–15% of NaCl and 5–15% of Na$_2$SO$_4$, and 0 to 30% of water. These compositions can also be present in aqueous solution, for example in the form of a 5–50% solution, for example a 5–20% solution.

In addition to the zinc phthalocyanine and/or aluminium phthalocyanine active ingredient, washing agents having an antimicrobial action, according to the invention, contain customary washing-agent constituents, for example one or more organic detergents and alkaline builder salts. For example, the compositions according to the invention can contain the washing-agent constituents mentioned above.

The washing agents having an antimicrobial action, according to the invention, preferably contain the sulfonated zinc phthalocyanine or aluminium phthalocyanine compounds in an amount of 0.0005 to 1.5 percent by weight, in particular 0.005 to 1 percent by weight, based on the total washing agent.

Moreover, washing agents having an antimicrobial action, according to the invention, can have the same composition as that described above for the washing and soaking agents having a bleaching action, according to the invention.

The sulfonated zinc phthalocyanine and aluminium phthalocyanine compounds which can be used in the process according to the invention or in the compositions according to the invention can be prepared by processes known per se in phthalocyanine chemistry. For example, the substituents which do not confer solubility in water (for example substituents R in the formulae (1) and (2)) can already be present in the starting materials (for example phthalic anhydride, phthalodinitrile or phthalimide) used for the synthesis of the phthalocyanine ring structure. After the synthesis of the now correspondingly substituted and, if appropriate, already metalised phthalocyanine has been carried out, the sulfonic acid groups can be introduced if they were not already present in the starting materials. Some substituents can also be introduced into the already synthesized phthalocyanine ring system, for example by chlorination, bromination or iodination (R=Cl, Br or I). The sulfonic acid groups can be introduced beforehand (cf., for example, U.S. Pat. No. 2,647,126) or, preferably, afterwards. If the synthesis of the phthalocyanine ring system is carried out from phthalic anhydride or phthalodinitrile in the presence of chlorides, for example AlCl$_3$ or ZnCl$_2$, already chlorinated phthalocyanines having a chlorine content of, in particular, 0.5–1.5 mols of chlorine per mol of aluminium or zinc phthalocyanine are formed. The sulfonic acid groups can likewise be introduced into such products afterwards. For the preparation of phthalocyanine compounds having mixed substituents, the said methods can be combined in a suitable manner. All the processes are well known in phthalocyanine chemistry and are described in detail therein.

The introduction of the sulfonic acid groups can be carried out, for example, by sulfonation, if appropriate with the aid of oleum. Alternatively, corresponding unsulfonated phthalocyanines can also be reacted with chlorosulfonic acid to give the corresponding phthalocyanine-sulfochlorides, and then hydrolysed to the sulfonic acids. In both cases, the free sulfonic acid groups can be converted to their salts afterwards.

All the reactions on the synthesised phthalocyanine ring system can be carried out when the latter is already in the form of the zinc or aluminium complex. However, it is also possible to introduce the substituents into the metal-free phthalocyanine structure and to metalise the latter afterwards, by customary methods (cf., for example, U.S. Pat. No. 4,166,780), for example by reacting the metal-free phthalocyanine compounds with a zinc or aluminium salt or alcoholate.

To introduce halogen atoms, it is also possible to diazotise zinc phthalocyanine or aluminium phthalocyanine substituted by amino groups, and to replace the diazonium group(s) by halogen (Sandmayr reaction). The introduction of the sulfo groups can likewise be carried out before or after the introduction of the halogen atoms.

The synthesis of the phthalocyanine ring structure from phthalic acid derivatives, with the formation of chlorinated phthalocyanines, is described in Ullmann's Encyclopte,uml/a/ die der technischen Chemie (Ullmann's Encyclopedia of Chemical Technology), 4th edition, Volume 18, page 508 et seq., and by F. H. Moser and A. L. Thomas in "Phthalocyanine" ("Phthalocyanines") (1963), page 104 et seq.. Halogenated phthalocyanines or phthalocyanines carrying other inert substituents can be obtained by the co-condensation of unsubstituted or correspondingly substituted phthalic acids or phthalic acid derivatives by customary processes known in phthalocyanine chemistry. The following preparation instructions 1a, 2a, 3a and 5a show how such processes can be carried out.

In the examples, which illustrate the preparation of the active substances and the process according to the invention in greater detail, parts and percentages are always by weight, unless stated otherwise. In all the examples, AlPC is the aluminium phthalocyanine ring system and ZnPC is the zinc phthalocyanine ring system. Furthermore, some of the phthalocyaninesulfonic acids are obtained in the preparation as the sodium salts. As is customary in dye chemistry, the group —SO$_3$H therefore also includes its sodium salts. The $\lambda_{max}$ values from the absorption spectrum, used to characterise the phthalocyanine compounds, were determined in a 1:1 mixture of ethanol/water at pH 7.

EXAMPLE 1

(a) 128 g of phthalic acid dinitrile, 40 g of AlCl$_3$ and 650 g of 1,2-dichlorobenzene are initially introduced into an autoclave. After flushing with nitrogen, the reaction mixture is heated at about 170° C. for 26 hours. After it has been cooled and deaerated, the suspension is poured, with stirring, into 400 ml of water containing 100 g of trisodium phosphate. The mixture is then evaporated to dryness on a rotary evaporator, the crude product is stirred with 750 ml of water and treated with 60 g of 50% NaOH and the mixture is heated to 75° C. and kept at this temperature for 2 hours. Finally, the crude product is filtered off and stirred in 500 ml of water containing 80 g of 32% HCl (2 hours at 90°–95° C.), the mixture is filtered hot and the product is washed. This gives aluminium phthalocyanine which contains about 1 mol of bonded chlorine per mol.

(b) 60 parts of the monochloro-aluminium phthalocyanine obtained according to (a) are introduced into 260 parts by volume of chlorosulfonic acid, with thorough stirring. The temperature is kept at 20° to 25° C. by external cooling. The reaction mixture is first stirred for half an hour at room temperature and the temperature is then raised to 110° to 115° C. over a period of one hour. After half an hour, the reaction temperature is increased to 130° to 135° C. over a period of one hour and maintained for four hours. The reaction mixture is then cooled to 70° to 75° C. and treated with 125 parts by volume of thionyl chloride over a period of 45 minutes. The reaction mixture is stirred for a further one hour at 85° to 90° C. and then left to cool to room temperature, and it is then discharged onto an ice/water mixture. The cold sulfochloride suspension is filtered with suction and the product is washed with icewater until the washings are free of acid.

The moist sulfoochloride paste is suspended in 1,200 parts of water. At 50° to 60° C., the sulfochloride groups are saponified to sulfo groups by adding sodium hydroxide. The saponification can be accelerated by adding catalytic amounts of pyridine.

After the saponification has ended, the weakly alkaline solution is evaporated to dryness. This gives 105 parts of a readily water-soluble, blue powder. According to analysis, the product contains, per mol of aluminium phthalocyanine, 1 mol of organically bonded chlorine and about 3.5 mols of sulfonic acid groups, and thus corresponds to the formula $(AlPC)Cl(SO_3H)_{3-4}$ having a $\lambda_{max}$ of 674 nm.

EXAMPLE 2

(a) In a flask fitted with a stirrer, 118 parts of urea, 20 parts of 4-chlorophthalic acid, 44.4 parts of phthalic anhydride, 27 parts of xylenesulfonic acid (mixture of isomers), 1 part of ammonium molybdate, 15 parts of aluminium chloride and 200 parts by volume of trichlorobenzene (mixture of isomers) are stirred thoroughly, warmed to 195° to 205° C. over a period of 3 hours and stirred at this temperature for 16 hours. After cooling, 500 parts by volume of isopropanol are added, the mixture is stirred for a short time and the suspension is then filtered with suction. The residue is washed with 500 parts by volume of isopropanol. The residue is taken up in 800 parts by volume of dilute sodium hydroxide solution, the mixture is stirred at 80° to 90° C. for 2 hours and the product is then filtered off with suction and washed with warm water. The same process is then carried out in dilute hydrochloric acid and the pigment obtained is washed with warm water until the washings are free of acid, and dried. About 50 parts of monochloro-aluminium phthalocyanine (201) are obtained in the form of a blue powder.

If the 4-chlorophthalic acid is replaced in the above instructions by corresponding amounts of dichlorophthalic acid or anhydride, tetrachlorophthalic acid or anhydride, 4-bromophthalic acid or anhydride, tetrabromophthalic acid or anhydride, 4-iodophthalic acid or anhydride or diiodophthalic acid or anhydride, and the procedure is otherwise as indicated above, the following halogenated phthalocyanines (pigments) are obtained:
(202) dichloro-aluminium phthalocyanine
(203) tetrachloro-aluminium phthalocyanine
(204) monobromo-aluminium phthalocyanine
(205) tetrabromo-aluminium phthalocyanine
(206) monoiodo-aluminium phthalocyanine
(207) diiodo-aluminium phthalocyanine (b) The halogenated phthalocyanine pigments (201) to (207) prepared according to (a) are converted to the corresponding compounds containing sulfo groups, by the method indicated in Example (1b). This gives the following compounds:

| | |
|---|---|
| (211) $(AlPC)Cl(SO_3H)_{3-4}$ | $\lambda_{max} = 674$ nm |
| (212) $(AlPC)Cl_2(SO_3H)_{3-4}$ | |
| (213) $(AlPC)Cl_4(SO_3H)_{3-4}$ | |
| (214) $(AlPC)Br(SO_3H)_{3-4}$ | $\lambda_{max} = 675$ nm |
| (215) $(AlPC)Br_4(SO_3H)_{3-4}$ | $\lambda_{max} = 677$ nm |
| (216) $(AlPC)I(SO_3H)_{3-4}$ | $\lambda_{max} = 678$ nm |
| (217) $(AlPC)I_2(SO_3H)_{3-4}$. | |

EXAMPLE 3

(a) In a sulfonating flask, 44.4 parts of phthalic anhydride, 22.7 parts of 4-bromophthalic anhydride, 74 parts of urea and 17 parts of aluminium chloride are warmed to 215° to 220° C. and stirred at this temperature for 2 hours. After cooling, the solid mass is comminuted. Purification is carried out by extraction with hot dilute sodium hydroxide solution, hot water, hot dilute hydrochloric acid and again hot water. After drying, 16.5 parts of monobromoaluminium phthalocyanine are obtained as a blue powder.

(b) The monobromo-aluminium phthalocyanine obtained according to (a) is reacted with chlorosulfonic acid analogously to Example (1b), and the monobromo-aluminium phthalocyanine-sulfochloride obtained is converted to the corresponding sulfonic acid by alkaline saponification. This gives a product which, according to analysis, contains, per mol of aluminium phthalocyaine, 1 mol of organically bonded bromine and about 3.5 mols of sulfonic acid groups, and therefore corresponds to the formula $(AlPC)Br(SO_3H)_{3-4}$ ($\lambda_{max} = 675$ nm).

If corresponding amounts of monofluoro-, monoiodo- or monocyano-aluminium phthalocyanine are used in Example 1(b) or 3(b) instead of the monochloro-aluminium phthalocyanine or monobromo-aluminium phthalocyanine, and the procedure is otherwise the same as indicated under 1(b) or 3(b), products of analogous composition, i.e. $(AlPC)F(SO_3H)_{3-4}$, $(AlPC)I(SO_3H)_{3-4}$ ($\lambda_{max} = 678$ nm) and $(AlPC)CN(SO_3H)_{3-4}$, are obtained. The fluoro-, iodo- or cyano-substituted aluminium phthalocyanines can be prepared analogously to Example 3(a), in a known manner, by conjoint synthesis from the corresponding substituted phthalic acid compounds and unsubstituted phthalic acid compounds.

EXAMPLE 4

60 parts of monochloro-zinc phthalocyanine are introduced into 260 parts by volume of chlorosulfonic acid, with thorough stirring. In this process, the temperature is kept at 20° to 25° C. by external cooling. The reaction mixture is first stirred for half an hour at room temperature and the temperature is then raised to 110° to 115° C. over a period of one hour. After half an hour, the reaction temperature is increased to 130° to 135° C. over a period of one hour, and maintained for 4 hours. The reaction mixture is then cooled to 70° to 75° C. and treated with 125 parts by volume of thionyl chloride over a period of 45 minutes. The reaction mixture is stirred for a further one hour at 85° to 90° C. and then left to cool to room temperature, and it is then discharged onto an ice/water mixture. The cold sulfochloride suspension is filtered with suction and the product is washed with ice-water until the washings are free of acid.

The moist sulfochloride paste is suspended in 1,200 parts of water and saponified to the sodium salt of monochloro-zinc phthalocyaninesulfonic acid, at 50° to 60° C., by adding sodium hydroxide. The weakly alkaline solution is evaporated to dryness. This gives a readily water-soluble, blue powder. This product corresponds to the formula $(ZnPC)Cl(SO_3H)_{3-4}$ ($\lambda_{max}=670$ nm).

The monochloro-zinc phthalocyanine used as the starting material is prepared (analogously to Example (3a)), by the known urea process, by conjoint synthesis from one equivalent of 4-chlorophthalic anhydride and 3 equivalents of phthalic anhydride, anhydrous $ZnCl_2$ being added.

The zinc phthalocyaninesulfonic acids of the formulae $(ZnPC)F(SO_3H)_{3-4}$, $(ZnPC)Br(SO_3H)_{3-4}$, $(ZnPC)I(SO_3H)_{3-4}$ and $(ZnPC)CN(SO_3H)_{3-4}$ are obtained analogously.

EXAMPLE 5

(a) In a flask fitted with a stirrer, an intimate mixture of 150 parts of urea, 20 parts of 4-chlorophthalic acid, 44.4 parts of phthalic anhydride, 27 parts of xylenesulfonic acid (mixture of isomers), 1 part of ammonium molybdate and 20 parts of zinc chloride is warmed slowly to 150° C. After 2 hours, the temperature is increased to 180° to 190° C. and the mixture is stirred for a further 12 hours. The cooled mass is finely comminuted, stirred with 200 parts by volume of isopropanol and filtered off with suction and the residue is washed with 200 parts by volume of acetone. The residue is stirred in 800 parts by volume of dilute sodium hydroxide solution at 80° to 90° C. for 2 hours, filtered off with suction and washed with warm water. The residue is then stirred in dilute hydrochloric acid at 80° to 90° C. for 2 hours, filtered off with suction, washed with water until the washings are free of acid, and dried. This gives 34 parts of monochloro-zinc phthalocyanine (501) in the form of a blue powder.

If the 4-chlorophthalic acid is replaced in the above instructions by corresponding amounts of tetrachloro-, 4-bromo-, tetrabromo-, 4-iodo- or diiodo-phthalic acid, and the procedure is otherwise as indicated above, the following halogenated phthalocyanines (pigments) are obtained:

(502) tetrachloro-zinc phthalocyanine
(503) monobromo-zinc phthalocyanine
(504) tetrabromo-zinc phthalocyanine
(505) monoiodo-zinc phthalocyanine
(506) diiodo-zinc phthalocyanine (b) The halogenated phthalocyanine pigments (501) to (506) prepared according to (a) are converted to the corresponding compounds containing sulfo groups, by the method indicated in Example 4. This gives the following compounds:

| | |
|---|---|
| (511) $(ZnPC)Cl(SO_3H)_{3-4}$ | $\lambda_{max} = 670$ nm |
| (512) $(ZnPC)Cl_4(SO_3H)_{3-4}$ | $\lambda_{max} = 672$ nm |
| (513) $(ZnPC)Br(SO_3H)_{3-4}$ | $\lambda_{max} = 669$ nm |
| (514) $(ZnPC)Br_4(SO_3H)_{3-4}$ | |
| (515) $(ZnPC)I(SO_3H)_{3-4}$ | |
| (516) $(ZnPC)I_2(SO_3H)_{3-4}$ | |

EXAMPLE 6

Test for the activity against bacteria and fungi

Method

A suspension of Staphylococcus aureus ATCC 6538 germs, containing a defined amount of germs per ml, is added to an aqueous solution which contains $(AlPC)Br(SO_3H)_{3-4}$ or $(AlPC)I(SO_3H)_{3-4}$ in a concentration of 0.01, 0.1 and 1.0 ppm. This test suspension is in a glass beaker under a water-cooled glass plate, in order to prevent warming as a result of the subsequent irradiation. Irradiation is then carried out for 5, 10, 20, 30 or 60 minutes with an incandescent lamp or an infra-red lamp ("Weiss" infra-red lamp, Philips IR, 250 W, Type 13372 E/06) which is at a distance of 20 cm above the surface of the suspension. The number of germs is then determined in the customary manner by parallel counts. The particular germ reduction is calculated in powers of ten according to the formula $\bar{x} = -\log_{10}(N/N_o)$, $N_o$ being the initial number of germs and $N$ being the number of germs surviving (average values from 5–10 parallel counts).

For comparison, the activity of $(AlPC)(SO_3H)_{3-4}$ is determined in exactly the same manner.

The germ reductions $\bar{x}$ obtained are summarised in the following Table 1.

TABLE 1

| | | Exposure time in minutes | | | | |
|---|---|---|---|---|---|---|
| | ppm | 5 | 10 | 20 | 30 | 60 |
| $(AlPC)(SO_3H)_{3-4}$ | 0.01 | action too small | | | 0.1 | 0.5 |
| | 0.1 | | 0.2 | 0.9 | 1.2 | 2.0 |
| | 1.0 | 0.9 | 1.6 | 2.3 | 2.7 | 3.4 |
| $(AlPC)Br(SO_3H)_{3-4}$ | 0.01 | | 0.7 | 1.5 | 2.0 | 2.9 |
| | 0.1 | 1.6 | 2.4 | 3.2 | 3.7 | 4.5 |
| | 1.0 | 3.3 | 4.0 | >4.6 | >4.6 | >4.6 |
| $(AlPC)I(SO_3H)_{3-4}$ | 0.01 | 1.0 | 1.8 | 2.7 | >4.6 | >4.6 |
| | 0.1 | 2.3 | 3.6 | >4.6 | >4.6 | >4.6 |
| | 1.0 | 4.1 | >4.6 | >4.6 | >4.6 | >4.6 |

The results in the table show that an excellent antibacterial action can be achieved with the compounds $(AlPC)Br(SO_3H)_{3-4}$ and $(AlPC)I(SO_3H)_{3-4}$, even for exceptionally short irradiation times. These values are considerably better than those which are obtained with the corresponding non-halogenated compound of the formula $(AlPC)(SO_3H)_{3-4}$.

Similarly good results are achieved with the compounds $(AlPC)F(SO_3H)_{3-4}$, $(AlPC)Cl(SO_3H)_{3-4}$, $(AlPC)CN(SO_3H)_{3-4}$, $(AlPC)Cl_2(SO_3H)_{3-4}$, $(AlPC)Cl_4(SO_3H)_{3-4}$, $(AlPC)Br(SO_3H)_{3-4}$, $(AlPC)Br_4(SO_3H)_{3-4}$, $(AlPC)I(SO_3H)_{3-4}$, $(AlPC)I_2(SO_3H)_{3-4}$, $(ZnPC)Cl(SO_3H)_{3-4}$, $(ZnPC)Br(SO_3H)_{3-4}$, $(ZnPC)I(SO_3H)_{3-4}$, $(ZnPC)Cl_4(SO_3H)_{3-4}$, $(ZnPC)Br_4(SO_3H)_{3-4}$ and $(ZnPC)I_2(SO_3H)_{3-4}$.

In the test process described above, the following bacteria and fungi are also used as test germs instead of Staphylococcus aureus ATCC 6538:

Strept. faecalis var. zymogenes NCTC 5957
Escherichia coli NCTC 8196
Pseudomonas aeruginosa ATCC 15442
Proteus vulgaris ATCC 6896
Aspergillus niger ATCC 6275
Candida albicans ATCC 10259
Trichophyton mentagrophytes ATCC 9533

The abovementioned zinc phthalocyaninesulfonic and aluminium phthalocyaninesulfonic acids with halogen atoms or a cyano group in the molecule also have excellent actions against these test germs. The action of each of these compounds is markedly better than that of the corresponding pure zinc phthalocyaninesulfonic or aluminium phthalocyaninesulfonic acid (without additional halogen or pseudo-halogen in the molecule).

EXAMPLE 7

Test for the disinfecting action on textiles

A piece of cotton fabric is stretched on a metal rack and inoculated with a test suspension (containing (AlPC)Br(SO$_3$H)$_{3-4}$ and a strain of test germ) described in Example 6. The metal rack, which is connected to a motor, is then rotated and irradiated with an infra-red lamp. A glass plate, which is cooled with running water in order to prevent warming of the piece of fabric, is located between the lamp and the piece of fabric. In parallel, a piece of fabric to which no microbicidal active substance has been applied is treated under the same experimental conditions. After irradiation for 1 hour, the numbers of germs are determined quantitatively and the germ reduction effected by the particular phthalocyanine is established. The action of (AlPC)Br(SO$_3$H)$_{3-4}$ against Strept. faecalis var. zymogenes NCTC 5957 was tested. Approximately the same germ reduction as in Example 6 was established.

EXAMPLE 8

Disinfection of surfaces

Enamelled tiles of dimensions 4×4 cm are inoculated with a suspension of Staphylococcus aureus ATCC 6538 germs; in this process, about 10$^5$ germs are uniformly distributed over the surface of one tile. An aqueous solution containing 1 ppm of the compound of the formula (AlPC)Cl(SO$_3$H)$_{3-4}$, (AlPC)Br(SO$_3$H)$_{3-4}$ or (AlPC)I(SO$_3$H)$_{3-4}$ is then sprayed onto the surface. The surface is then irradiated for 30 or 45 minutes with an incandescent lamp (250 W, distance: 20 cm). After this time, samples are taken by transfer to Rodac dishes. After 30 minutes, only 1 colony can be observed in the case of treatment with (AlPC)Cl(SO$_3$H)$_{3-4}$, while in the case of the other two compounds tested, and for an exposure time of 45 minutes in the case of all 3 compounds tested, no further growth of the germ can be observed at all.

If the other halogenated or CN-substituted phthalocyaninesulfonic acids indicated as test compounds in Example 6 are used in the surface disinfection test described above, similarly good results are obtained. After an exposure time of 45 minutes, no further germ growth on the surface can be established in the case of treatment with all the compounds tested.

EXAMPLE 9

Disinfection of an effluent from a sewage purification plant

A sample of slurry is taken from a laboratory sewage purification plant and filtered through a filter paper. One of each of the phthalocyanine compounds to be tested, of the formulae (AlPC)Cl(SO$_3$H)$_{3-4}$, (AlPC)Br(SO$_3$H)$_{3-4}$ or (AlPC)I(SO$_3$H)$_{3-4}$, is added to the filtrate, which contains about 10$^6$ germs/ml, until its concentration in the filtrate is 1 ppm. The filtrate is then illuminated with standard light of 380–730 nm, 300 mW/cm$^2$. After various intervals of time, the remaining number of germs is determined. After only 45 minutes, there are no longer any staphylococci present. After a longer irradiation time (1–several hours), the number of the other germs present in the filtrate also decreases markedly.

EXAMPLE 10

Disinfection of swimming pools

Swimming pools each having a capacity of 5,000 liters of water are set up in the open. The water of one pool is treated with the compound of the formula (AlPC)Cl(SO$_3$H)$_{3-4}$ in a concentration of 0.5 ppm. At intervals of 1–5 days, water samples are taken and the numbers of germs are determined quantitatively. In the microbiological test, (a) the total number of germs and (b) the number of coliform germs are determined.

Result: In the pool which did not contain any monochloroaluminium phthalocyaninesulfonic acid, the coliform germs multiplied up to 2–3.10$^1$ germs/100 ml. In the pool containing the active substance, no coliform germs are detected up to the 16th day of the experiment.

For a further test, a suspension of germs containing Staphylococcus aureus ATCC 6538 and Escherichia coli ATCC 11229, each in an amount of 50 germs per 100 ml of pool capacity, is added to the water on the 16th day of the experiment. Immediately after the introduction of the germs, measurement shows a uniform distribution in the pool. After 24 hours, no coliform germs and no staphylococci are detected in the pool containing the active substance (100 ml samples of water taken in each case). The total number of germs, consisting of autochthonous germ flora (germ flora characteristic of the swimming pool), remained constant throughout the experiment.

EXAMPLE 11

A tea-stained cotton fabric[*] weighing 1 g is treated, at 55° C., under illumination with a 200 W incandescent lamp[**], for one hour, with stirring, with 200 ml of an aqueous wash liquor which contains 0.75 ppm of (AlPC)Cl(SO$_3$H)$_{3-4}$ (prepared according to Example 1 or 2) and 1 g of a washing agent of the following composition:

| | |
|---|---|
| sodium dodecylbenzenesulfonate | 16% |
| sodium tripolyphosphate | 43% |
| sodium silicate | 4% |
| magnesium silicate | 2% |
| fatty alcohol sulfate | 4% |
| sodium carboxymethylcellulose | 1% |
| sodium salt of ethylenediaminetetraacetic acid | 0.5% |
| sodium sulfate | 29.5% |

[*]The staining of the cotton sample with tea is carried out as follows: 15 g of tea ("Fine Ceylon Fannings Tea") are boiled for 1 hour in 600 ml of demineralised water and then filtered off. The tea leaves which have been filtered off are taken up in 400 ml of demineralised water and boiled again for about 60 minutes. The two filtrates are combined and made up to 1,000 ml with demineralised water. 45 g of cotton fabric (bleached and mercerised) are treated in this tea for 2½ hours at 100° C., with continuous agitation, and "dyeing" is then carried out for a further 16 hours while the bath is cooling. The tea liquor is then treated with 5 g of sodium chloride and treatment is carried out for a further 2½ hours at 100° C. Lastly, the liquor is cooled and the stained cotton is rinsed twice at 60° C. and dried at 100° C. Finally, the stained fabric is also washed with a liquor which contains 5 g/liter of washing agent (composition: cf. above), for 20 minutes, at 90° C. and with a liquor ratio of 1:20, rinsed with warm and cold water and dried at 100° C. in a circulating-air oven.
[**]Lamp used: "Luxram" incandescent lamp, 220/230 V, 200 W, E 27, frosted. The lamp is located about 10 cm above the wash liquor. Measured intensity of illumination: 19,000 lux.

The piece of fabric is then visually assessed and it is found that its brightness is well above that of the stained fabric. However, the piece of fabric treated as above is also markedly brighter than one obtained under comparable conditions, but using 0.75 ppm of pure (AlPC)-(SO$_3$H)$_{3-4}$ (without chlorine bonded to the nucleus) as the photosensitising bleaching agent.

Measurements of the fabric samples in respect of their brightness values, with an Elrepho photometer from ZEISS, confirm the visual impression.

Similarly good results as with (AlPC)Cl(SO$_3$H)$_{3-4}$ are obtained if the latter is replaced by (AlPC)F(SO$_3$H)$_{3-4}$, (AlPC)Br(SO$_3$H)$_{3-4}$, (AlPC)I(SO$_3$H)$_{3-4}$, (AlPC)CN(SO$_3$H)$_{3-4}$, (AlPC)Br$_4$(SO$_3$H)$_{3-4}$, (AlPC)Cl$_2$(SO$_3$H)$_{3-4}$, (AlPC)Cl$_4$(SO$_3$H)$_{3-4}$, (ZnPC)Cl$_4$(SO$_3$H)$_{3-4}$, (ZnPC)Br$_4$(SO$_3$H)$_{3-4}$, (ZnPC)Cl(SO$_3$H)$_{3-4}$, (ZnPC)F(SO$_3$H)$_{3-4}$, (ZnPC)Br(SO$_3$H)$_{3-4}$ or (ZnPC)I(SO$_3$H)$_{3-4}$.

EXAMPLE 12

Ten 1 g samples of a cotton fabric dyed with a brown dye(*) are introduced into a wash liquor which contains 4 g/liter of a washing agent of the composition indicated in Example 11, and a determined amount (in % by weight, based on the weight of the fabric), shown in the following table, of (AlPC)Cl(SO$_3$H)$_{3-4}$, (AlPC)Br(SO$_3$H)$_{3-4}$, (AlPC)I(SO$_3$H)$_{3-4}$ and, for comparison purposes, of (AlPC)(SO$_3$H)$_{3-4}$. With continuous agitation, the samples to be bleached are washed at 50° C. for 60 minutes, with a liquor ratio of 1:100 and under irradiation with an infra-red lamp(**). The samples are then rinsed and dried and the degree of bleaching of the dried sample is then measured with the aid of an ®Elrepho photometer from ZEISS (standard light type D 65, 2 degree normal observer, measuring diaphragm: $\phi=35$ mm), in the form of brightness values, expressed in %, based on the absolute white according to the CIE Recommendation of 1.1.1969. The values obtained are given in the following Table 2 and represent average values.

(*)The dyeing of the cotton sample is carried out as follows: 150 mg of the commercially available brown dye of the formula

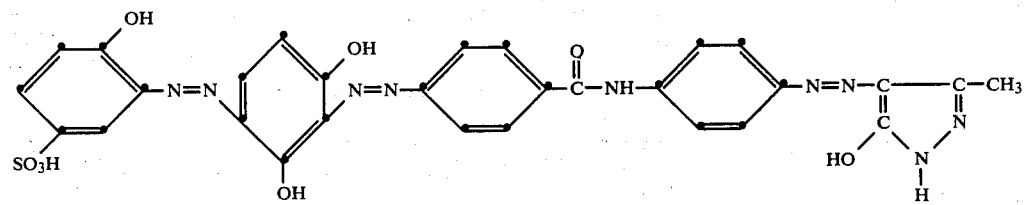

are dissolved, at a temperature of 50° C., in 2,000 ml of water containing 1 g of sodium carbonate. In this dye liquor, 100 g of cotton fabric (bleached and mercerised) are dyed, with continuous agitation, the bath being heated to 90° C. over a period of 30 minutes. At 90° C., dyeing is carried out for 90 minutes, 20 g of sodium sulfate decahydrate being added in 4 equal portions at intervals of 15 minutes during this time. After the dyeing operation, the fabric is rinsed twice with cold water and is coppered for 20 minutes, at 60° C. and with a liquor ratio of 1:20, in a bath which contains 0.75 g/liter of copper sulfate crystals and 1 ml/liter of glacial acetic acid. The dyeing is then rinsed twice with cold water and dried in a hot-air oven at 100° C.

(**)Lamp used: "Philips" infra-red lamp (Weiss), 220/230 V, 250 W, with reflector, type 13372 E/06. The lamp is located about 15 cm above the liquor.

TABLE 2

| Compound tested | Amount in the wash liquor | Brightness value in % |
| --- | --- | --- |
| (AlPC)Cl(SO$_3$H)$_{3-4}$ | 0.0035% | 80.20 |
| (AlPC)Br(SO$_3$H)$_{3-4}$ | 0.002% | 81.67 |
| (AlPC)I(SO$_3$H)$_{3-4}$ | 0.0023% | 81.05 |
| (AlPC)(SO$_3$H)$_{3-4}$ | 0.004% | 80.20 |
| — | — | 56.5 |

(= unbleached test fabric)

The results in Table 2 show that, using smaller amounts, the halogen-containing aluminium phthalocyaninesulfonic acid derivatives achieve degrees of bleaching as high or even higher than the non-halogenated aluminium phthalocyaninesulfonic acid (AlPC)(SO$_3$H)$_{3-4}$ used for comparison.

Similar results are obtained when using the corresponding analogous zinc phthalocyanine derivatives.

EXAMPLE 13

10 g of a cotton sample dyed according to Example 12 with brown dye are introduced into 200 ml of water in which 0.75 mg of (AlPC)Br(SO$_3$H)$_{3-4}$, (AlPC)I(SO$_3$H)$_{3-4}$ or (AlPC)Cl(SO$_3$H)$_{3-4}$ and 0.2 g of sodium tripolyphosphate are dissolved. The liquor is warmed to 75° C., with continuous agitation, and left at this temperature for 90 minutes, 4 g of sodium sulfate decahydrate being added in 4 equal portions at 10-minute intervals. The sample of fabric is then rinsed with cold water for a short time and dried in a circulating-air oven at 100° C. All the operations described above are carried out with extensive protection from the light.

For comparison purposes, a sample of fabric of the same type is treated, the 0.75 mg of the abovementioned halogenated phthalocyaninesulfonic acids being replaced by the same amount of non-halogenated aluminium phthalocyaninesulfonic acid (AlPC)(SO$_3$H)$_{3-4}$.

The dyed samples of fabric are then dampened with a buffer solution of pH 10 (composition: 0.03 mol/liter of disodium tetraborate and 0.042 mol/liter of sodium hydroxide) and irradiated under an "overhead projector" (Portable Projector Model 088/88 BH from 3M, with a type 78-8454/3480 lamp from General Electric, 240 V, 480 W), at room temperature, the pieces of fabric being under a glass plate at a distance of 30 cm below the lamp (measured intensity of illumination: 46,000 lux). For checking purposes, a piece of fabric dyed brown but not treated with an aluminium phthalocyanine is also irradiated in the same manner.

To determine the brown dye destroyed during irradiation and the amount of phthalocyanine compounds remaining on the fabric, the samples are evaluated colorimetrically against standard dyeings. It is found that with (AlPC)Cl(SO$_3$H)$_{3-4}$, (AlPC)Br(SO$_3$H)$_{3-4}$ and (AlPC)I(SO$_3$H)$_{3-4}$, for various irradiation times, more brown dye is destroyed than with non-halogenated aluminium phthalocyaninesulfonic acid.

If the corresponding zinc compounds prepared according to Example 4 or 5, or the aluminium compounds of the formulae $(AlPC)Cl_2(SO_3H)_{3-4}$, $(AlPC)Cl_4(SO_3H)_{3-4}$, $(AlPC)F(SO_3H)_{3-4}$, $(AlPC)Br_4(SO_3H)_{3-4}$ or $(AlPC)I_2(SO_3H)_{3-4}$, are used instead of the aluminium compounds, similar results are obtained.

EXAMPLE 14

Ten 1 g samples of a cotton fabric dyed according to Example 12 with a brown dye are introduced into a wash liquor which contains 4 g/liter of a washing agent of the composition indicated in Example 11, and 0.005 or 0.01% by weight, based on the weight of fabric, of $(ZnPC)Cl(SO_3H)_{3-4}$, $(ZnPC)Br(SO_3H)_{3-4}$, $(ZnPC)Cl_4(SO_3H)_{3-4}$ and, for comparison purposes, $(ZnPC)(SO_3H)_{3-4}$. With continuous agitation, the samples to be bleached are washed at 50° C. for 60 or 120 minutes, at a liquor ratio of 1:100 and under irradiation with an infra-red lamp (cf. Example 12). The samples are then rinsed and dried and the degree of bleaching of the dried samples is then measured with the aid of an ®Elrepho photometer from ZEISS (standard light type D 65, 2 degree normal observer, measuring diaphragm: $\phi=35$ mm), in the form of brightness values (Y), expressed in %, based on the absolute white according to the CIE Recommendation of 1.1.1969. The values obtained are given in the following Table 3 and represent average values.

TABLE 3

| Compound tested | Amount in the wash liquor (in % by weight, based on the weight of fabric) | Brightness values Y in % after | |
|---|---|---|---|
| | | 60 minutes | 120 minutes |
| $(ZnPC)(SO_3H)_{3-4}$ | 0.005 | 74.2 | 75.6 |
| | 0.01 | 76.4 | 79.0 |
| $(ZnPC)Cl(SO_3H)_{3-4}$ | 0.005 | 80.6 | 82.1 |
| | 0.01 | 83.0 | 85.3 |
| $(ZnPC)Cl_4(SO_3H)_{3-4}$ | 0.005 | 79.6 | 82.3 |
| | 0.01 | 82.1 | 85.3 |
| $(ZnPC)Br(SO_3H)_{3-4}$ | 0.005 | 80.6 | 83.9 |
| | 0.01 | 81.5 | 84.7 |
| — | — | — | 50.3 |
| (= unbleached test fabric) | | | |

The results in Table 3 show that the halogen-containing zinc phthalocyaninesulfonic acids achieve markedly higher brightness values than the non-halogenated zinc phthalocyaninesulfonic acid used for comparison. Alternatively, expressed in another way, the halogen-containing compounds can be used in substantially smaller amounts than the non-halogenated product in order to achieve the same or a better brightness value.

EXAMPLE 15

The washing process of Example 14 is repeated, but (a) the amount of the particular test compound used is 0.015% by weight, based on the weight of the cotton fabric, (b) the prepared liquor is irradiated for 30 minutes before the cotton fabric is introduced, and (c) the irradiation time after the introduction of the fabric (=bleaching time) is only 60 minutes.

The measurement of the degree of bleaching of the sample of fabric is carried out as described in Example 14. The values obtained are summarised in the following Table 4. The individual values represent an average value of the 10 individual measurements.

TABLE 4

| Compound tested | Brightness value (Y) |
|---|---|
| $(ZnPC)(SO_3H)_{3-4}$ | 70.6 |
| $(ZnPC)Cl(SO_3H)_{3-4}$ | 79.4 |
| $(ZnPC)Cl_4(SO_3H)_{3-4}$ | 78.2 |
| $(ZnPC)Br(SO_3H)_{3-4}$ | 77.8 |
| — | 51.1 |

The results in Table 4 show that, in the case where the liquor is subjected to the irradiation before the actual washing process, the halogenated phthalocyaninesulfonic acids surprisingly still achieve substantially higher brightness values than the corresponding non-halogenated compound. This condition is of practical significance if, for example, a housewife prepares the wash liquor and leaves it to stand in the light (for example in the open) without starting the washing immediately or if the wash liquor is used frequently and is allowed to stand in the light between two washing operations. In this case, the halogenated phthalocyanine compounds give substantially better bleaching effects.

The other phthalocyanine compounds mentioned in Examples 1-5 also give similarly good results.

EXAMPLE 16

5 g samples of a test fabric (EMPA test fabric No. 114, obtainable from the Eidgenössische Materialprüf- und Versuchsanstalt, CH-9001 St. Gallen, Unterstrasse 11, Switzerland) stained with red wine are washed for 30 minutes at 50 C., with a liquor ratio of 1:50, in a liquor which contains 5 g/liter of a washing agent of the composition indicated in Example 11, and 0.005% by weight, based on the weight of the test fabric, of $(AlPC)(SO_3H)_{3-4}$ or $(AlPC)Br_4(SO_3H)_{3-4}$. For comparison, a piece of fabric is washed in a liquor which does not contain phthalocyanine compound. After washing, the pieces of fabric are rinsed for a short time and then laid in the midday sun for 2 hours and dampened several times. The degree of bleaching (brightness) of the samples of fabric is then determined as indicated in Example 14. The brightness values (Y) obtained are summarised in the following Table 5.

TABLE 5

| Washing process | Brightness value (Y) |
|---|---|
| (1) without phthalocyanine compound | 66.2 |
| (2) with 0.005% of $(AlPC)(SO_3H)_{3-4}$ | 79.8 |
| (3) with 0.005% of $(AlPC)Br_4(SO_3H)_{3-4}$ | 83.4 |
| Test fabric without washing | 43.6 |

The results in Table 5 again show that the halogenated phthalocyaninesulfonic acid produces a substantially better bleaching (stain-removing) effect than the corresponding non-halogenated compound.

What is claimed is:

1. In a process for combating micro-organisms in or on an organic or inorganic substrates by treating the substrate with one or more water-soluble phthalocyanines selected from the group consisting of the sulfonated zinc phthalocyanines and the sulfonated aluminium phthalocyanines, in the presence of water and under irradiation with light, the improvement which comprises using a phthalocyanine which is further substituted by a halogen atom or a pseudohalogen group.

2. A process of claim 1, wherein the phthalocyanine is of the formula

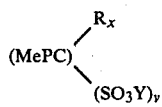

wherein MePC is the zinc phthalocyanine or aluminum phthalocyanine ring system, Y is hydrogen, an alkali metal ion, an ammonium ion or an amine salt ion, v is any number between 1 and 4, R is fluorine, chlorine, bromine, iodine or cyano and x is any number between 0.1 and 8, it being possible for the substituents R present in the molecule to be identical or different.

3. A process of claim 2, wherein Y is hydrogen, an alkali metal ion or an ammonium ion, v is any number between 1.3 and 4, R is chlorine, bromine or iodine and x is any number between 0.5 and 8.

4. A process of claim 3, wherein Y is hydrogen, sodium or potassium, v is a number between 2 and 4, R is chlorine or bromine, and x is any number between 0.8 and 2.

5. A process of any one of claims 2 to 4, wherein MePC is the aluminum phthalocyanine ring system.

6. A process of claim 5 wherein x is any number between 0.8 and 1.5, v is any number between 3 and 4 and Y is hydrogen or sodium.

7. A process of claim 1, for combating microorganisms on a substrate wherein the irradiation is by an incandescent lamp, infra-red lamp or sunlight in an aqueous treatment bath or on water-containing substrate.

8. A process of claim 7 for the disinfection of laundry, which comprises washing the laundry, under irradiation with infra-red or visible light, in a wash liquor which contains 0.001 to 100 ppm of the phthalocyanine.

9. A process of claim 7 for the disinfection or antimicrobial finishing of textiles, which comprises treating the latter in a liquor which contains 0.01 to 50 ppm of the phthalocyanine.

10. A process of claim 8 wherein the wash liquor further contains an inorganic salt.

11. A process of claim 1 for the disinfection of surfaces, which comprises applying, to said surfaces, an aqueous solution of the phthalocyanine and then exposing the still damp surfaces to sunlight.

12. A process of claim 1 for the disinfection of water in swimming pools, which comprises adding to the water 0.001 to 50 ppm of the phthalocyanine, and irradiating the water with sunlight or an artificial light.

13. A process of claim 1 for the disinfection of an effluent from a sewage purification plant, which comprises adding to the effluent 0.001 to 100 ppm of the phthalocyanine and irradiating the effluent with an artificial light or sunlight.

* * * * *